(12) United States Patent
Cook

(10) Patent No.: US 9,046,193 B1
(45) Date of Patent: Jun. 2, 2015

(54) SELF-SUPPORTING, FLEXIBLE SUPPORT FOR FLEXIBLE HOSE THAT TRANSPORTS PRODUCT FROM BULK TRANSPORT TANK

(71) Applicant: ALUMINUM LADDER COMPANY, Florence, SC (US)

(72) Inventor: Anthony J. Cook, Florence, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 17 days.

(21) Appl. No.: 13/898,654

(22) Filed: May 21, 2013

Related U.S. Application Data

(60) Provisional application No. 61/813,314, filed on Apr. 18, 2013.

(51) Int. Cl.
*F16L 3/00* (2006.01)
*F16L 3/015* (2006.01)

(52) U.S. Cl.
CPC ...................................... *F16L 3/015* (2013.01)

(58) Field of Classification Search
CPC ................. F16L 3/00; F16L 3/26; F16L 3/10; F16L 3/1058; F16L 3/1226; B05B 15/063; A61M 2209/082; A01G 25/00; E03F 1/008; E03C 31/021; E03C 2001/028; E04D 2013/0813; B25H 1/06
USPC ......... 248/70, 51, 80, 75, 76, 81–84, 49, 158, 248/150; 404/95, 109; 137/351; 414/390; 138/106
See application file for complete search history.

(56) References Cited

U.S. PATENT DOCUMENTS

| | | | |
|---|---|---|---|
| 3,592,239 A * | 7/1971 | Adler | 138/155 |
| 4,715,570 A * | 12/1987 | Mashuda | 248/49 |
| 4,774,979 A | 10/1988 | McKeon et al. | |
| 5,277,386 A | 1/1994 | Olsen | |
| 6,503,139 B2 * | 1/2003 | Coral | 454/65 |
| 6,609,873 B2 | 8/2003 | Just et al. | |
| 7,481,601 B2 | 1/2009 | Gilchrist | |
| 7,600,719 B2 * | 10/2009 | Wehler et al. | 248/49 |
| 8,210,770 B2 | 7/2012 | Halvorson | |

* cited by examiner

*Primary Examiner* — Nkeisha Smith
(74) *Attorney, Agent, or Firm* — Dority & Manning, P.A.

(57) ABSTRACT

A self-supporting, flexible support for a flexible hose that is used for loading and unloading flowable bulk product from the bottom of a container includes an articulating arm having a plurality of connected carriage members.

24 Claims, 13 Drawing Sheets

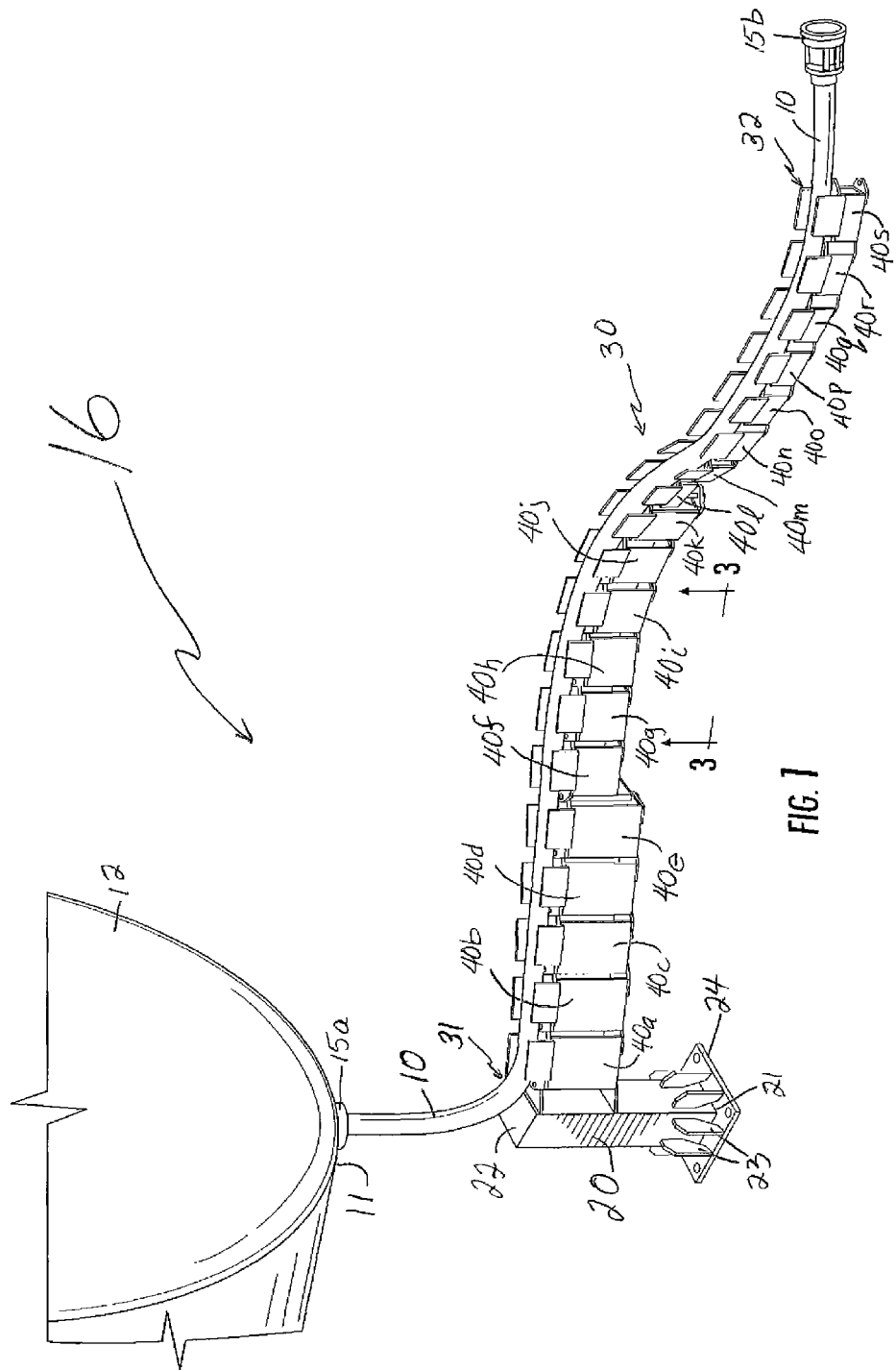

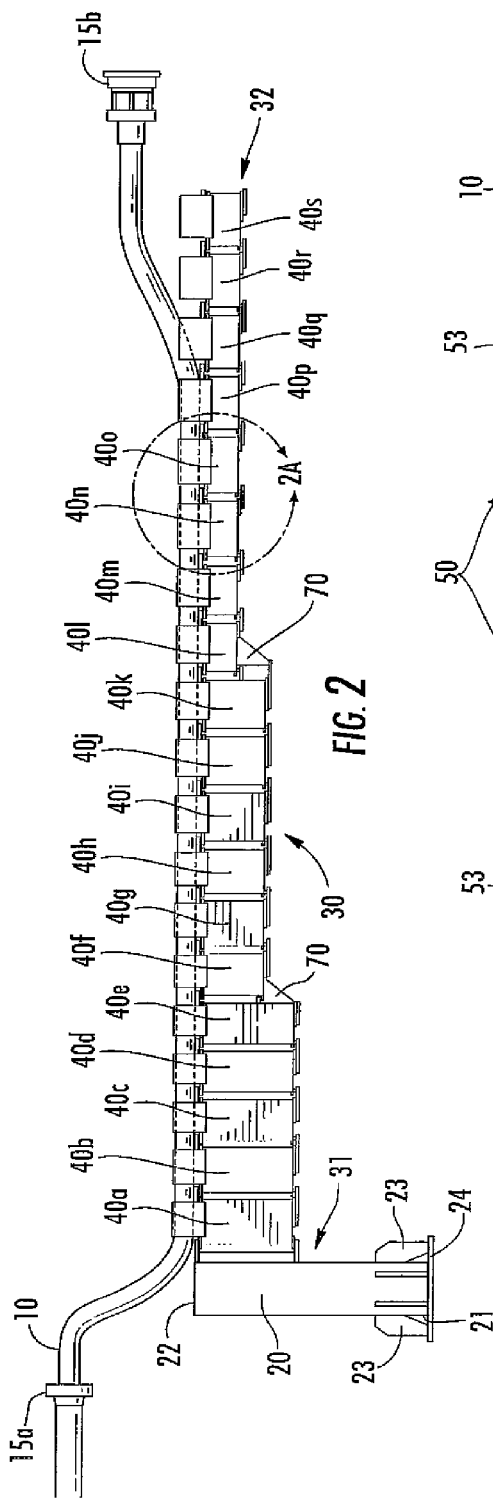
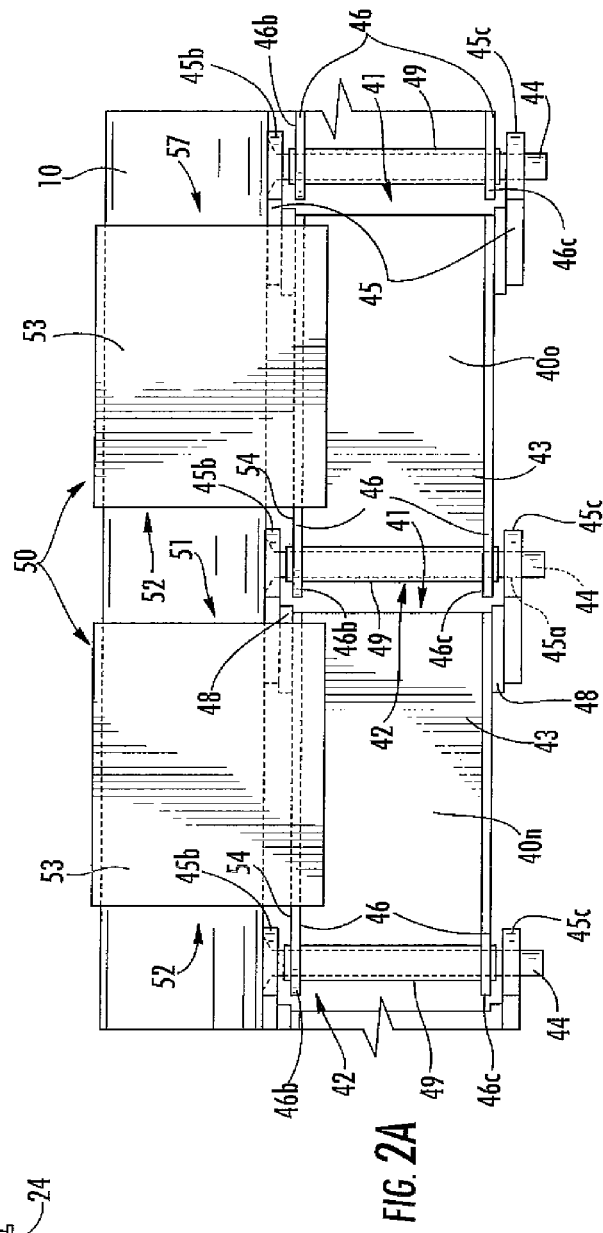

SELF-SUPPORTING, FLEXIBLE SUPPORT FOR FLEXIBLE HOSE THAT TRANSPORTS PRODUCT FROM BULK TRANSPORT TANK

CROSS-REFERENCE TO RELATED APPLICATION

The present application claims priority to U.S. Provisional Patent Application Ser. No. 61/813,314, filed Apr. 18, 2013, which is hereby incorporated herein in its entirety for all purposes by this reference.

STATEMENT REGARDING FEDERALLY SPONSORED RESEARCH OR DEVELOPMENT

Not applicable.

FIELD OF THE INVENTION

The subject matter disclosed herein generally involves flexible hoses that transfer flowing bulk product between a transport tank carried on a truck or rail car for transport and a storage container or another transport tank.

BACKGROUND OF THE INVENTION

Flexible hoses that transfer flowing bulk product between a transport tank carried on a truck or rail car for transport and a storage container or another transport tank tend to be large in both length and girth relative to the size of human hands. Such hoses also tend to be rather heavy and must be dragged along the ground between connection points or lifted onto a dolly for such transport. In so doing, a worker sometimes can lose sight of the fact that sections of the hose are bending beyond their desired bend radius limitations, thereby inadvertently damaging the hose. Thus, when preparing for the loading or unloading of bulk product, workers can encounter difficulty when maneuvering such hoses into position for connection to the bottom of the tanks carried by bulk transport vehicles. Such difficulties can manifest themselves in the extended time needed to accomplish these tasks and in the risk of injury to the workers trying to accomplish these tasks. When not in use, such hoses can become entangled, giving rise to undesirable kinks that reduce the useful life of the hose. Moreover, when not in use, such hoses can pose a tripping hazard to workers in the area devoted to loading and unloading the bulk product. While encasing such hoses within a series of pivotally connected rigid cylindrical conduits might seem effective to eliminate some of drawbacks noted above, having to thread the hose through these conduits is in itself so time-consuming, difficult and likely to damage the hose in the process as to render such apparatus into a false cure that is worse than the disease.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which:

FIG. 1 is an elevated perspective view of an embodiment of a self-supporting, flexible support for a hose used for loading and unloading flowable bulk product from the bottom of a container shown in part.

FIG. 2 is a side elevation view of the embodiment of FIG. 1.

FIG. 2A is an enlarged side plan view of a section of FIG. 2.

Figure 3:
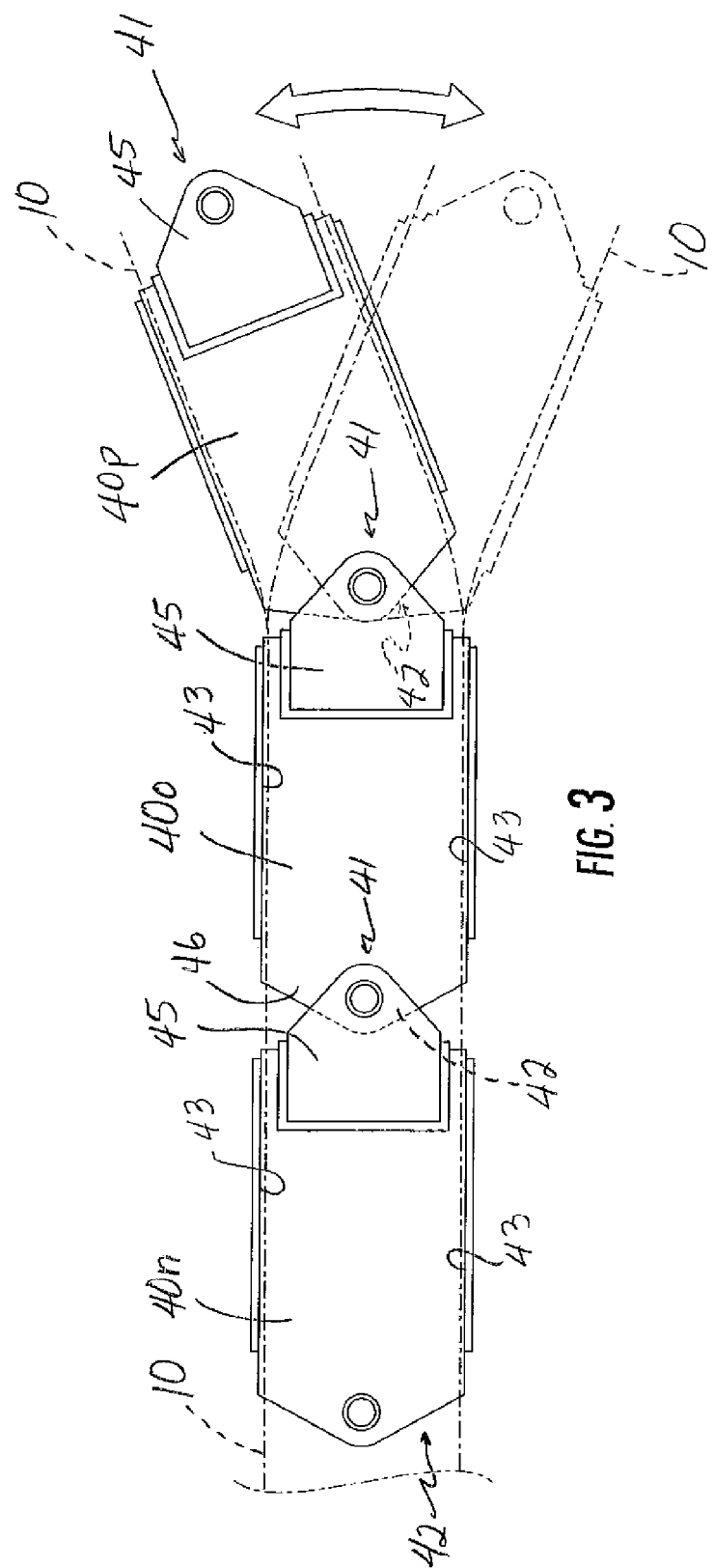
FIG. 3 is an enlarged plan view taken along the direction of the arrows designated 3-3 in FIG. 1 with an alternative positioning of components shown in chain dashed line.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the structures.

Each example is provided by way of explanation the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

References to the vertical refer to the direction that is parallel to the direction of the earth's gravitational pull. References to the axial or longitudinal refer to the lengthwise direction in which the articulated arm forming a cantilever elongates along a horizontal direction above the ground and perpendicular to the vertical. References to the transverse direction refer to the widthwise direction that is perpendicular to the lengthwise direction and to the vertical direction. A reference to the diameter of a surface refers to the diameter of the circle that defines the intersection of the surface with a plane that is normal to the axis of rotation of the surface. References to the circumferential refer to the tangential direction. The meaning of additional reference terms will become apparent through their usages in the text that follows.

Figure 6:
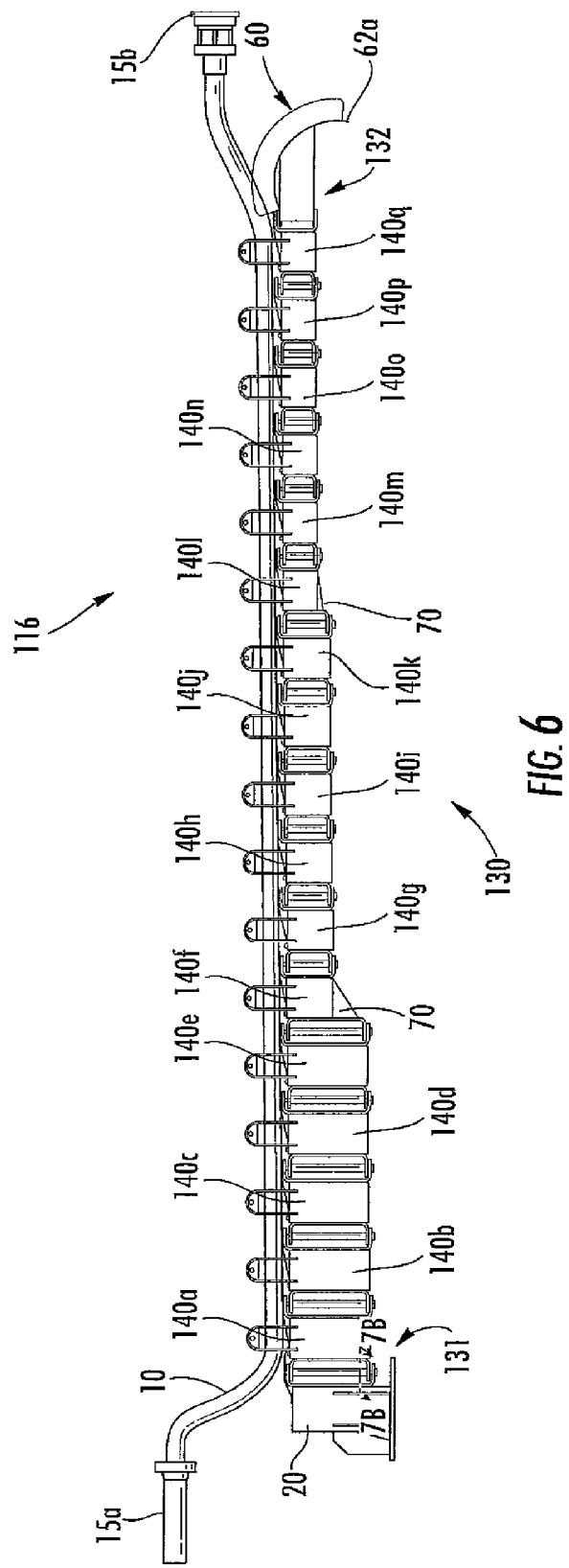
FIG. 6 is a side elevation view of another embodiment of a self-supporting, flexible support for a hose used for loading and unloading flowable bulk product.

Two embodiments of a self-supporting, flexible support for a flexible hose 10, which is used for loading and unloading flowable bulk product from the bottom 11 of a container 12, are depicted in FIGS. 1 and 6 and respectively indicated generally by the numerals 16 and 116. Each of FIGS. 2 and 6 schematically illustrates a respective embodiment of the self-supporting, flexible support 16 or 116 of the present invention from a side plan view at a time before or after the transport tank (designated 12 as partially depicted in FIG. 1) becomes connected to the hose 10 by one of the two connection fixtures 15*a*, 15*b* on either axially opposite end of the hose 10. Indeed, when unloading crude oil from tanks 12 carried on railcars (not shown), the end of the hose 10 designated 15*b* in FIG. 2 would be connected to the bottom 11 of the tank 12 (FIG. 1) of the railcar, while the end of the hose 10 designated 15*a* in FIGS. 2 and 6 would be connected to piping that would lead to another tank, usually a tank buried underground, and from there pumped to storage tanks.

Such flexible hoses 10 used for loading and unloading flowable bulk product from the bottom 11 of a container 12 typically are cylindrical with circular transverse diameters on the order of four to eight inches. Such flexible hoses 10 can be made of rubber, nylon, various metals or tightly woven fabric and often are lined with coatings that are resistant to abrasion, corrosion, permeability of liquids or all three types of coatings. Moreover, such flexible hoses 10 typically have a minimum bending radius such that any tighter bending of the hose 10 is likely to damage the integrity of the hose 10 and thus should be avoided.

Figure 7:
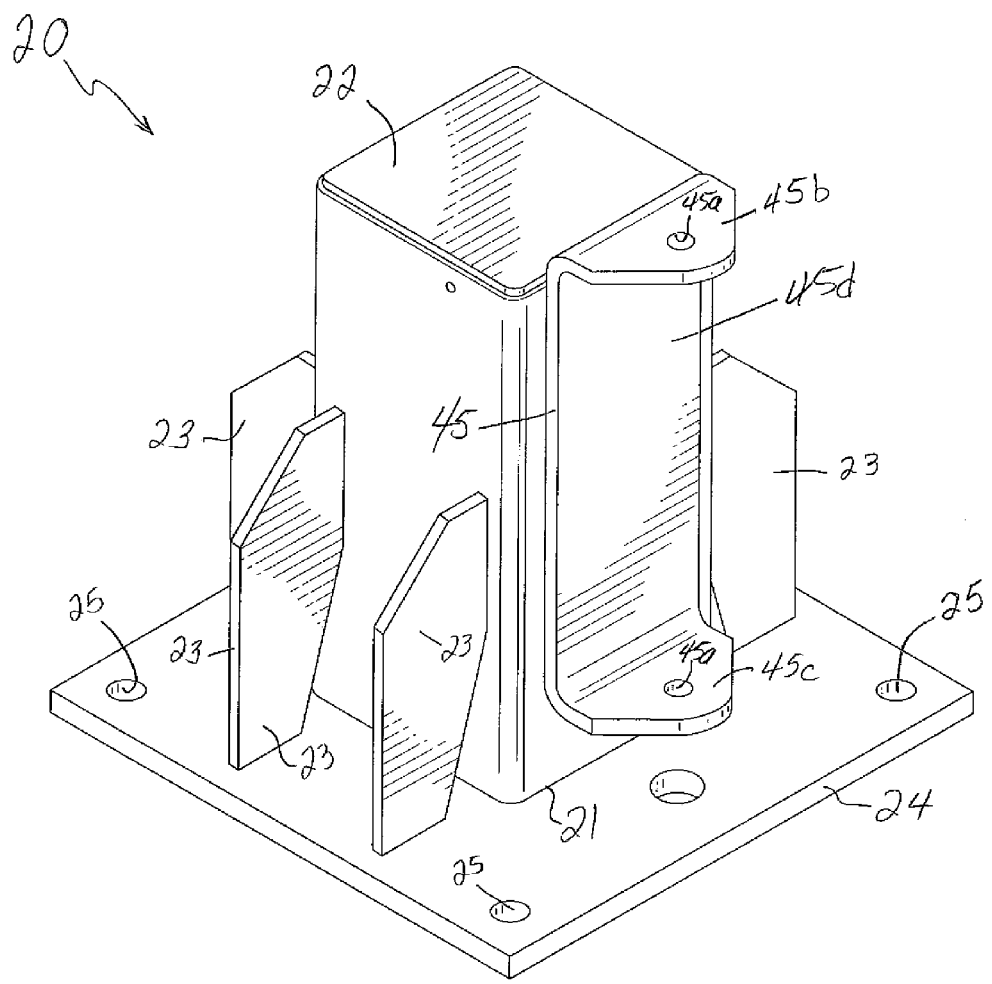
FIG. 7 is an elevated perspective view of an embodiment of a stanchion of an embodiment of a self-supporting, flexible support for a hose used for loading and unloading flowable bulk product.

As schematically shown in FIGS. 1, 2 and 6, embodiments of the self-supporting, flexible support 16, 116 of the present invention desirably include a vertically extending stanchion 20. As shown in FIG. 7 for example, the stanchion 20 defines a bottom end 21 and a top end 22 spaced vertically apart from the bottom end 21. The stanchion 20 desirably is made of sturdy rigid material such as steel, and desirably is attached, as by welding, to buttresses 23 that in turn are attached to a foundation 24 that desirably can be formed as a flat steel plate. So that the foundation 24 can be bolted to the ground or a sturdy floor such as one made of concrete, a through hole 25 desirably is defined through each corner of the embodiment of the rectangular plate that forms the foundation 24 shown in FIG. 7. The buttresses 23 desirably are disposed so as to maintain the verticality of the stanchion 20. As will become apparent with further explanation, the stanchion 20 and its components must be strong enough to support the weight of a cantilevered arm (described below) and the hose 10 when the hose is in use transferring flowable bulk product from one storage vessel 12 at one location to another storage vessel at another location.

As schematically shown in FIGS. 1, 2 and 6, examples of embodiments of the self-supporting, flexible support 16, 116 of the present invention desirably include a respective articulated arm 30, 130 forming a cantilever. As schematically shown in FIGS. 1 and 2, the articulated arm 30 defines a proximal end 31 pivotally connected to the stanchion 20 near the top end 22 of the stanchion 20. As schematically shown in FIGS. 1 and 2, the articulating arm 30 extends outwardly in a generally horizontal direction with respect to the vertically extending stanchion 20 and terminates in a distal end 32 of the arm 30. References to the proximal refer to locations that are closer to the stanchion 20 while references to the distal refer to locations that are farther away from the stanchion 20 and closer to the free end of the respective articulated arm 30 or 130.

As schematically shown in the embodiment depicted in FIG. 6, the articulated arm 130 defines a proximal end 131 pivotally connected to the stanchion 20 near the top end 22 of the stanchion 20. As schematically shown in FIG. 6, the articulating arm 130 extends outwardly in a generally horizontal direction with respect to the vertically extending stanchion 20 and terminates in a distal end 132 of the arm 130.

As schematically shown in FIGS. 1 and 2, the articulating arm 30 includes a plurality of carriage members 40, and to facilitate this description each carriage member is given its own separate designating numeral 40*a*, 40*b*, 40*c*, 40*d*, 40*e*, 40*f*, 40*g*, 40*h*, 40*i*, 40*j*, 40*k*, 40*l*, 40*m*, 40*n*, 40*o*, 40*p*, 40*q*, 40*r* and 40*s*. The number of carriage members 40 can be greater than or fewer than the number depicted in the exemplary embodiment of FIGS. 1 and 2. In the embodiment of the articulating arm 30 schematically shown in FIG. 6 for example, there are fewer carriage members 140*a*, 140*b*, 140*c*, 140*d*, 140*e*, 140*f*, 140*g*, 140*h*, 140*i*, 140*j*, 140*k*, 140*l*, 140*m*, 140*n*, 140*o*, 140*p* and 40*q* than the number depicted in the exemplary embodiment of FIGS. 1 and 2. The number of carriage members 40 depends on the characteristics of the flowable bulk product, the hose 10 and the distance over which the hose 10 must be extended in order to transfer the flowable bulk product from one storage vessel 12 at one location to another storage vessel at another location.

Figure 8:
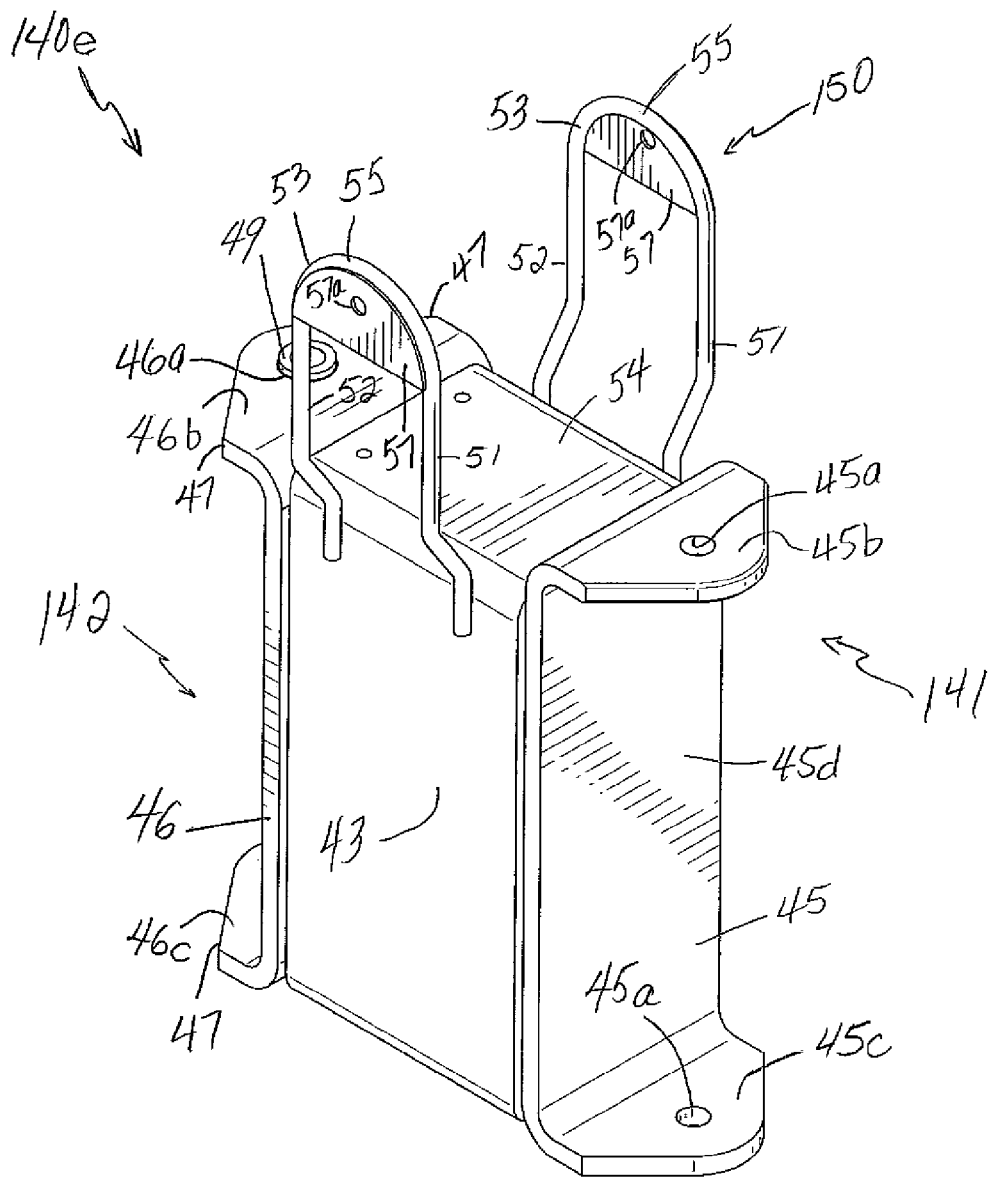
FIG. 8 is an elevated perspective view of an embodiment of a carriage member of an embodiment of a self-supporting, flexible support for a hose used for loading and unloading flowable bulk product.
Figure 9:
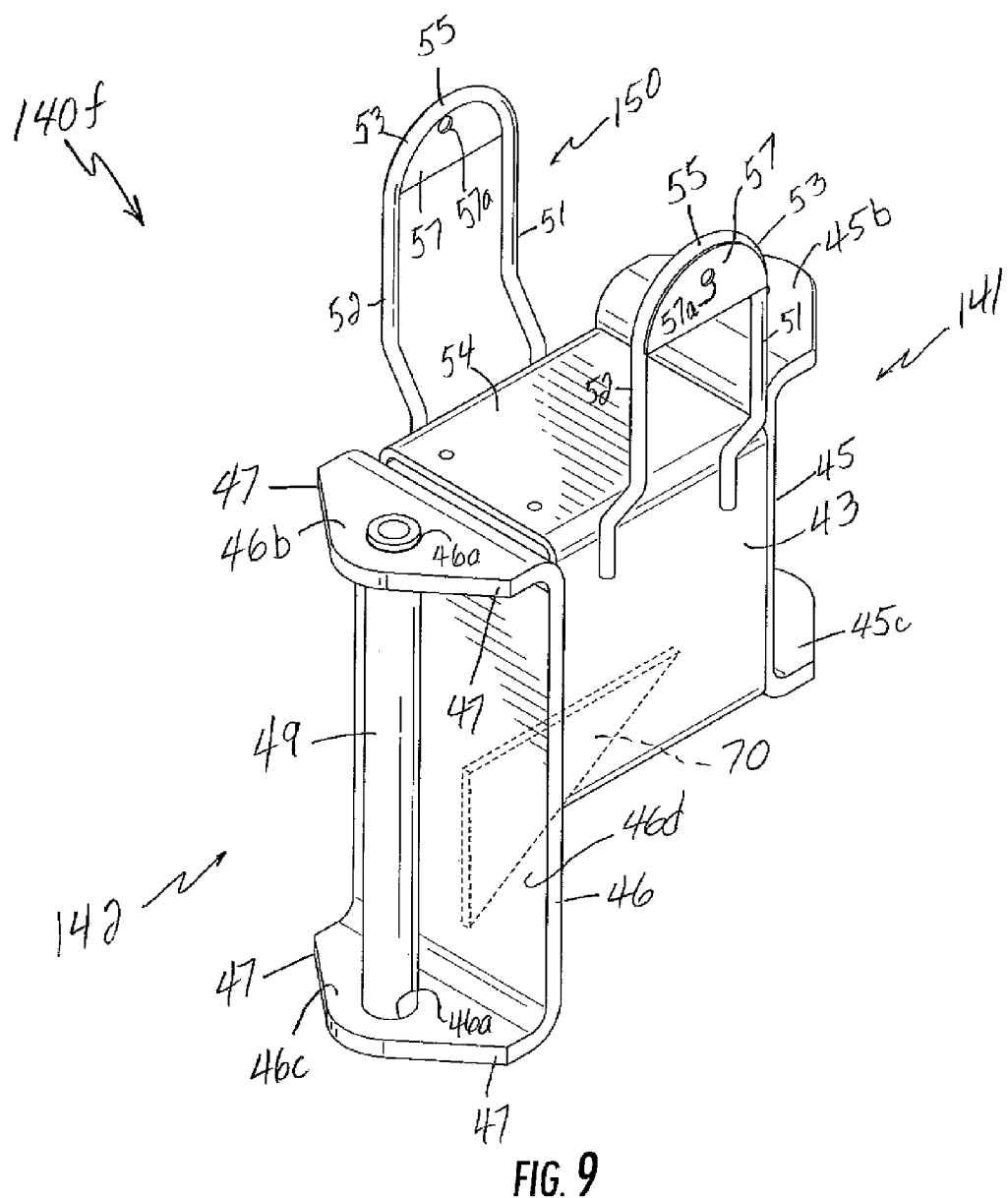
FIG. 9 is an elevated perspective view of an embodiment of a carriage member of an embodiment of a self-supporting, flexible support for a hose used for loading and unloading flowable bulk product.
Figure 10:
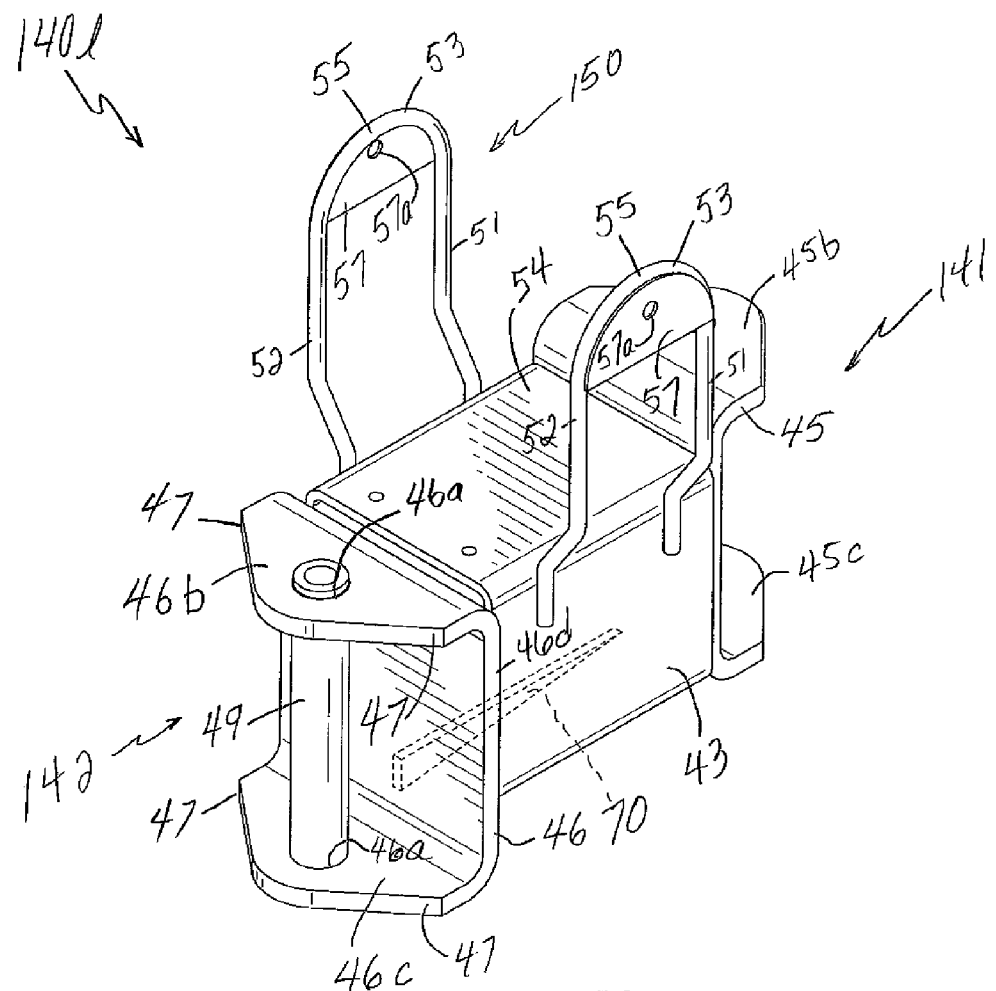
FIG. 10 is an elevated perspective view of an embodiment of a carriage member of an embodiment of a self-supporting, flexible support for a hose used for loading and unloading flowable bulk product.

Each carriage member embodiment 40, 140 has axially opposite ends, which nominally are called the first end 41, 141 and the second end 42, 142. As schematically shown in FIG. 3 for example, each carriage member 40*n*, 40*o*, 40*p* has a first end 41 and a second end 42 disposed spaced apart in an axial direction from the first end 41 of the carriage member 40*n*, 40*o*, 40*p*. As schematically shown in FIGS. 8, 9 and 10 for example, each carriage member 140*a*, 140*f* and 140*l* has a first end 141 and a second end 142 disposed spaced apart in an axial direction from the first end 141 of the respective carriage member 140a, 140f and 140l.

The respective first end 41 or 141 of each respective carriage member 40 or 140 defines the leading end of each respective carriage member 40 or 140. When the respective carriage members 40 or 140 are assembled into their respective articulated arm 30 or 130, then the respective leading end 41 or 141 of each respective carriage member 40 or 140 faces away from the stanchion 20 and points toward the distal end of the respective articulated arm 30 or 130.

The respective second end 42 or 142 of each respective carriage member 40 or 140 defines the trailing end of each respective carriage member 40 or 140. When the respective carriage members 40 or 140 are assembled into their respective articulated arm 30 or 130, then the respective trailing end 42 or 142 of each respective carriage member 40 or 140 faces toward the stanchion 20 and points away from the distal end of the respective articulated arm 30 or 130.

As schematically shown in FIGS. 1 and 2, the proximal end 31 of the articulating arm 30 is defined by a proximal carriage member 40a. As schematically shown in FIG. 6, the proximal end 131 of the articulating arm 130 is defined by a proximal carriage member 140a. In each respective embodiment, the proximal carriage member 40a, 140a has one of its ends 41, 141 or 42, 142 pivotally connected to the stanchion 20. In the embodiment of FIGS. 6 and 8, the trailing end 142 of the proximal carriage member 140a is the end that desirably is pivotally connected to the stanchion 20.

The respective distal end 32, 132 of the respective articulating arm 30, 130 is defined by a respective distal carriage member 40s, 140q. The distal carriage member 40s has one of its ends 41 or 42 pivotally connected to one of the ends 41 or 42 of one of the plurality of other carriage members 40r. In the embodiment of FIGS. 6 and 10, the trailing end 142 of the distal carriage member 140q is the end that desirably is pivotally connected to one of the plurality of other carriage members 40p.

Figure 11:
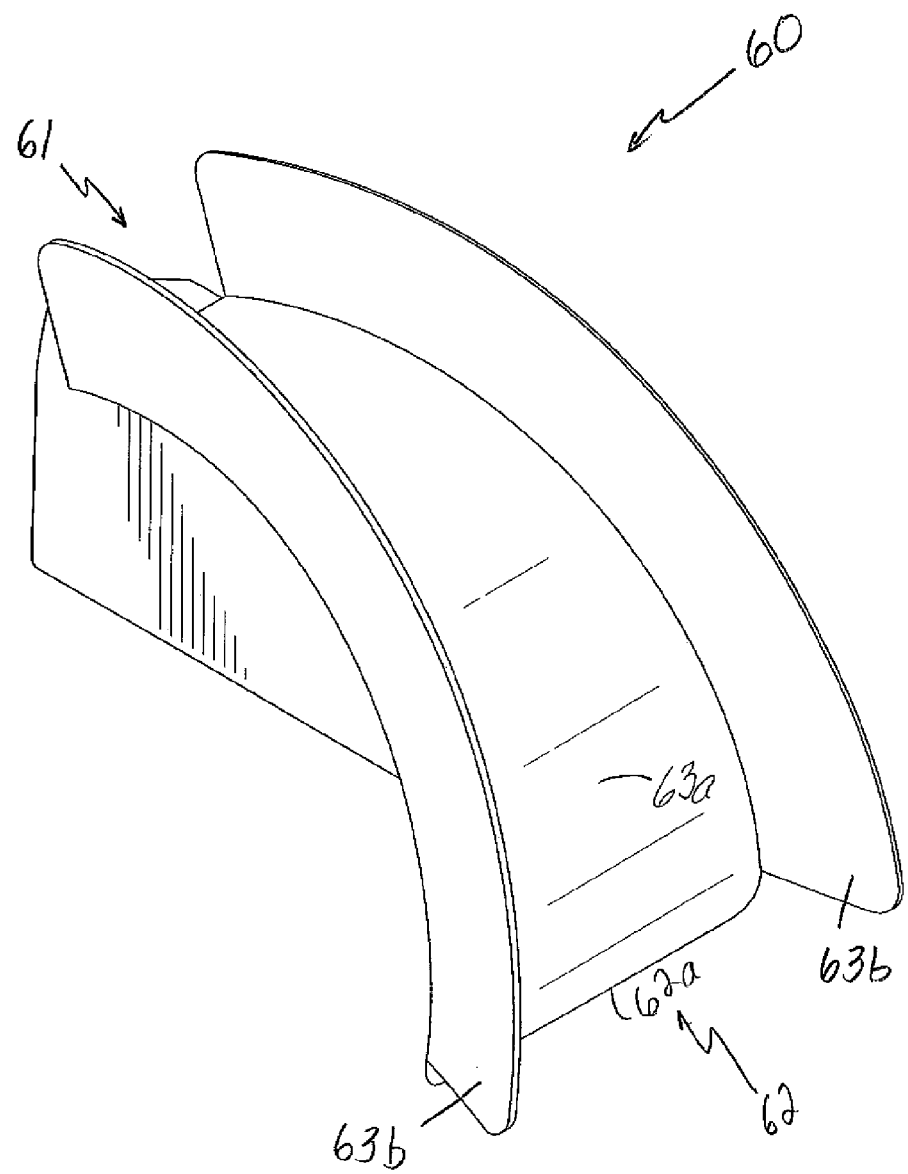
FIG. 11 is an elevated perspective view of an embodiment of an end piece for the articulated arm of an embodiment of a self-supporting, flexible support for a hose used for loading and unloading flowable bulk product.
Figure 12:
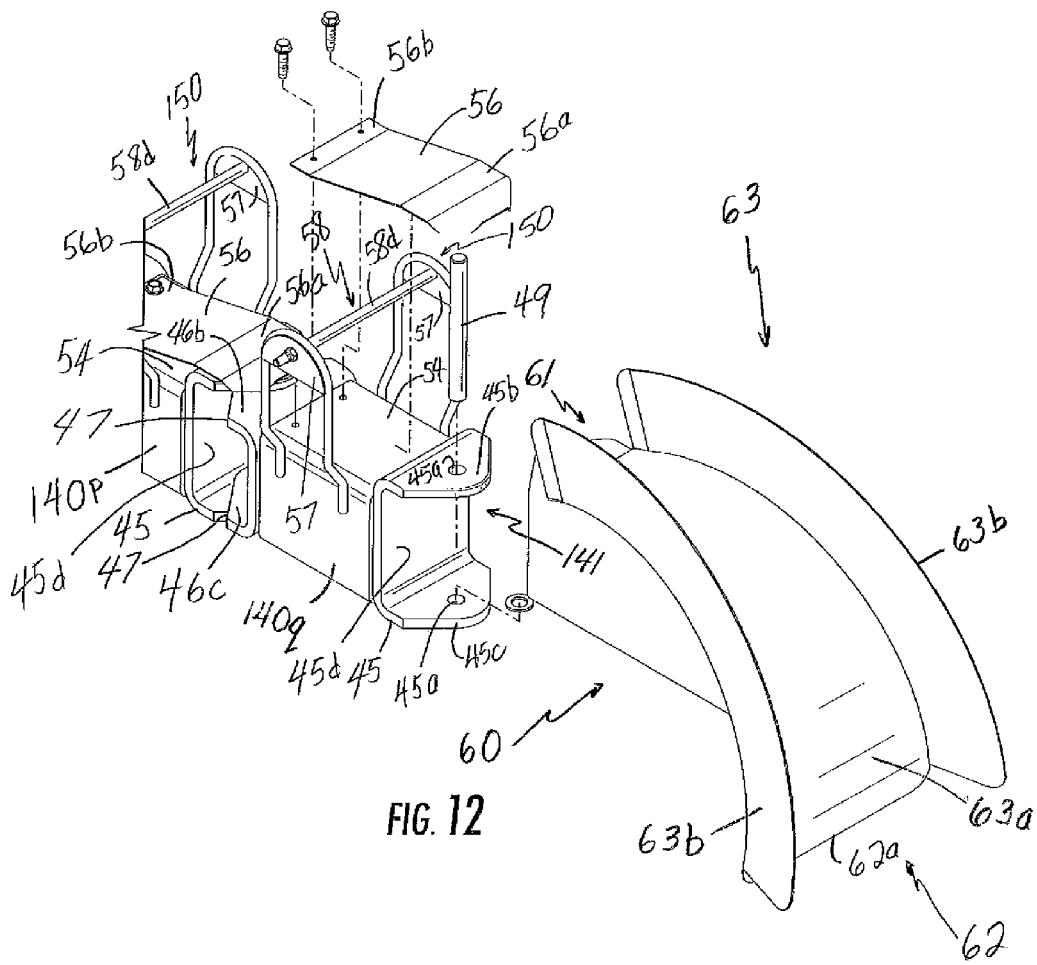
FIG. 12 is an elevated perspective view of parts of an embodiment of a self-supporting, flexible support for a hose used for loading and unloading flowable bulk product.

As schematically shown in FIG. 6 for example, a presently preferred embodiment of a self-supporting, flexible support 116 for a flexible hose 10 desirably includes an end piece 60 connected to a distal carriage member 140q. As schematically shown in FIG. 12 for example, the first end 61 of the end piece 60 desirably is pivotally connected to the leading end 141 of the distal carriage member 140q. The end piece 60 has a second end 62 spaced axially apart from the first end 61. As schematically shown in FIG. 11 for example, the end piece 60 desirably includes a chute 63 that is carried by the end piece 60 and extends axially from the first end 61 of the end piece 60 to the second end 62 of the end piece 60. The chute 63 desirably is configured with a downwardly sloping floor 63a and a pair of downwardly sloping and spaced apart sides 63b. Each of the sides 63b of the chute 63 extends vertically above the floor 63a and bounds each opposite lateral side of the floor 63a. As schematically shown in FIGS. 11 and 12 for example, the sides 63b of the chute 63 are spaced apart in a diverging manner as one proceeds from the first end 61 of the end piece 60 toward the second end 62 of the end piece 60. This configuration of the chute 63 supports the discharge end of the hose 10 in a manner that permits fluid easily to drain from the hose 10 and allows the operator greater freedom of side-to-side movement of the discharge end of the hose 10.

With the exception of the proximal carriage members 40a, 140a and the distal carriage members 40s, 140q, each of the remaining carriage members 40, 140 in the articulated arm 30, 130 is disposed between two neighboring carriage members 40, 140. This aspect is schematically shown for example in FIGS. 1, 2 and 3, in which each of the remaining carriage members 40o, if any, of the articulated arm 30 is disposed between two neighboring carriage members 40n, 40p. Referring to the carriage member 40o for purposes of this explanation, as schematically shown in FIGS. 1, 2 and 3 for example, an exemplary carriage member 40o that is disposed somewhere in the articulated arm 30 between the proximal carriage member 40a and the distal carriage member 40s has its first end 41 pivotally connected to the second end 42 of one the two neighboring carriage members 40p and its second end 42 pivotally connected to the first end 41 of the other of the two neighboring carriage members 40n. Thus, as schematically shown in FIGS. 1, 3, 5 and 6 for example, the respective self-supporting, flexible support 16, 116 of the present invention desirably exhibits flexibility in the sense of pivoting movement in a generally horizontal X-Y plane.

As schematically shown in FIGS. 3, 4, 8, 9 and 10 for example, each carriage member 40 or 140 is defined by a pair of the opposed sides 43, and each side that desirably extends axially and vertically to form a flat plate. Each side 43 of each carriage member 40 or 140 desirably has the same dimensions and is a mirror image of each opposite side 43 of the same carriage member 40 or 140. As schematically shown in FIGS. 4, 8, 9 and 10 for example, the sides 43 of each carriage member 40 or 140 desirably can be integrally formed of part of a short section of a hollow metal conduit having a transverse cross-sectional shape that is square or rectangular. As schematically shown in FIG. 2A for example, each carriage member 40 defines a height measured in the vertical direction. As schematically shown in FIGS. 3, 4, 8, 9 and 10 for example, the height of each carriage member 40 is defined by the vertical dimension that is height of each of the opposed sides 43 of the carriage member 40. As schematically shown in FIGS. 1, 2 and 6 for example, the height of the respective proximal carriage member 40a, 140a is greater than the height of the respective distal carriage member 40s, 140q.

As schematically shown in FIGS. 1, 2 and 6 for example, the axial lengths and the transverse widths of each of the carriage members 40, 140 desirably are uniform in their dimensions. However, different axially extending sections of the articulated arm 30, 130 desirably are characterized by different heights of the carriage members 40, 140 within that section of the articulated arm 30, 130. Moreover, those sections of the articulated arm 30, 130 that are disposed relatively closer to the stanchion 20 desirably have carriage members 40a, 40b, 40c, 40d, 40e or 140a, 140b, 140c, 140d, 140e with heights that are greater than the heights of the carriage members 40, 140 in sections of the articulated arm 30, 130 that are disposed relatively farther away from the stanchion 20.

Desirably, the number of respective carriage members 40, 140 having the same heights in each section of the respective articulated arm 30, 130 can vary. However, as schematically shown in FIGS. 1 and 2 for example, the number of carriage members 40 of uniform heights in each section of the articulated arm 30 desirably can increase as one proceeds farther away from the stanchion 30. Thus, in the embodiment schematically shown in FIGS. 1 and 2 for example, there are fewer carriage members 40a, 40b, 40c, 40d, 40e having the same heights in the section of the articulated arm 30 that is disposed relatively closer to the stanchion 20 than the number of carriage members 40f, 40g, 40h, 40i, 40j, 40k having the same heights in the section of the articulated arm 30 that is disposed relatively farther away from the stanchion 20. Similarly, in the embodiment schematically shown in FIGS. 1 and 2 for example, there are more carriage members 40l, 40m, 40n, 40o, 40p, 40q, 40r, 40s having the same heights in the section of the articulated arm 30 that is disposed relatively closer to the distal end 32 of the articulated arm 30 than the number of carriage members 40*f*, 40*g*, 40*h*, 40*i*, 40*j*, 40*k* having the same heights in the section of the articulated arm 30 that is disposed relatively closer to the stanchion 20. If one considers the end piece 60 to be a substitute for a carriage member 140, then this aspect is equally true of the embodiment of the articulated arm 130 that is schematically shown in FIG. 6 for example.

As schematically shown in FIGS. 1, 2 and 6 for example, the heights of the respective carriage members 40*a*, 40*b*, 40*c*, 40*d*, 40*e* or 140*a*, 140*b*, 140*c*, 140*d*, 140*e* in the section of the respective articulated arm 30 or 130 that includes the respective proximal carriage member 40*a* or 140*a* are greater than the heights of the respective carriage members 40*l*, 40*m*, 40*n*, 40*o*, 40*p*, 40*q*, 40*r*, 40*s* or 140*l*, 140*m*, 140*n*, 140*o*, 140*p*, 140*q* in the section of the respective articulated arm 30 or 130 that includes the respective distal carriage member 40*s* or 140*q*. Moreover, the heights of the respective carriage members 40 or 140 in the section of the respective articulated arm 30 or 130 that includes the respective intermediate carriage members 40*f*, 40*g*, 40*h*, 40*i*, 40*j*, 40*k* or 140*f*, 140*g*, 140*h*, 140*i*, 140*j*, 140*k* also are greater than the heights of the respective carriage members 40*l*, 40*m*, 40*n*, 40*o*, 40*p*, 40*q*, 40*r*, 40*s* or 140*l*, 140*m*, 140*n*, 140*o*, 140*p*, 140*q* in the section of the respective articulated arm 30 or 130 that includes the respective distal carriage member 40*s* or 140*q*. However, the heights of the carriage members 40 in the section of the respective articulated arm 30 or 130 that includes the respective intermediate carriage members 40*f*, 40*g*, 40*h*, 40*i*, 40*j*, 40*k* or 140*f*, 140*g*, 140*h*, 140*i*, 140*j*, 140*k* are smaller than the heights of the respective carriage members 40*a*, 40*b*, 40*c*, 40*d*, 40*e* or 140*a*, 140*b*, 140*c*, 140*d*, 140*e* of the section of the articulated arm 30 that includes the respective proximal carriage member 40*a* or 140*a*. In this way, the weights of the respective carriage members 40 or 140 in the sections disposed relatively farther from the stanchion 20 become progressively less and thus reduce the moment of the bending force acting on the respective articulating arm 30 or 130 of the respective support apparatus 16 or 116 at the farther distances from the stanchion 20.

So that the carriage members 40, 140 can be pivotally connected to one another, each axially opposite end of each carriage member 40, 140 defines a clevis. As schematically shown in FIGS. 2A, 4, 8, 9 and 10 for example, the respective first (leading) end 41 or 141 of each respective carriage member 40 or 140 defines a first (leading) clevis 45 that is attached (as by welding) to the respective first (leading) end 41 or 141 of each respective carriage member 40 or 140. As schematically shown in FIGS. 2A, 3, 8, 9 and 10 for example, the respective second (trailing) end 42 or 142 of each respective carriage member 40 or 140 defines a second (trailing) clevis 46 that is attached (as by welding) to the respective second (trailing) end 42 or 142 of each respective carriage member 40 or 140. As schematically shown in FIGS. 2A, 4, 8, 9 and 10 for example, each respective clevis 45, 46 includes a respective horizontally extending upper flange 45*b*, 46*b* that is vertically spaced apart from a respective horizontally extending lower flange 45*c*, 46*c*.

Figure 4:
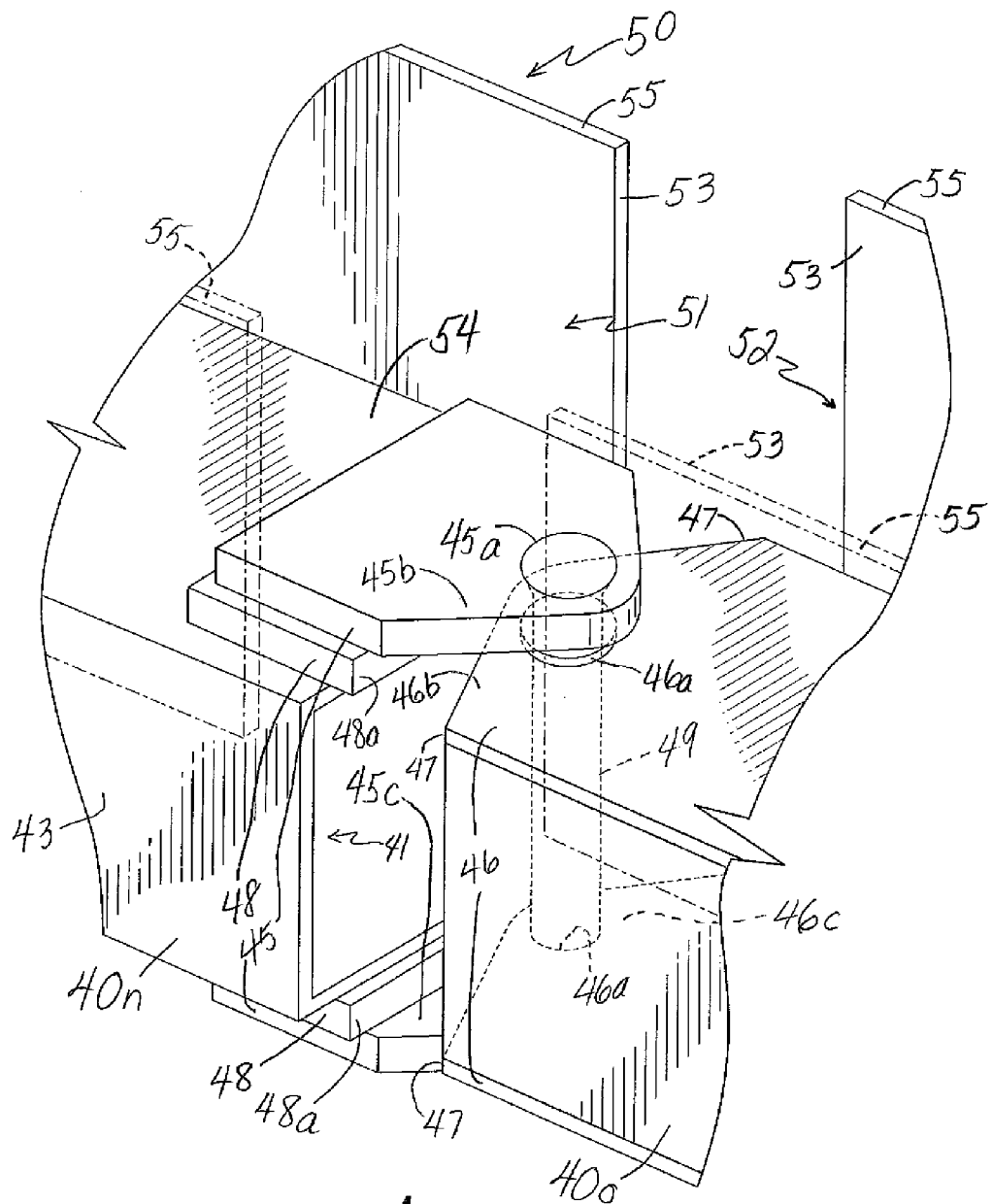
FIG. 4 is an enlarged elevated perspective view of parts of the detail of FIG. 2A.

As schematically shown in FIG. 8 for example, in some embodiments of the respective leading clevis 45 and trailing clevis 46, the respective upper flange 45*b*, 46*b* and associated lower flange 45*c*, 46*c* are formed of a unitary member that is connected by a respective vertically extending connecting plate 45*d* or 46*d*, which in turn is connected (as by welding for example) to the respective leading end 141 or trailing end 142 of the respective carriage member 140. However, as schematically shown in FIG. 4 for example, in other embodiments of the respective leading clevis 45 and trailing clevis 46, the respective upper flange 45*b*, 46*b* and associated lower flange 45*c*, 46*c* are formed of a separate members that are connected (as by welding for example) to the respective leading end 41 or trailing end 42 of the respective carriage member 40.

As schematically shown in FIGS. 4, 7B, 9 and 10 for example, the trailing clevis 46 of a respective carriage member 40 or 140 defines a pair of aligned holes 46*a* through the respective upper and lower flanges 46*b*, 46*c* of the trailing clevis 46. As schematically shown in FIGS. 2A, 7B, 9 and 10 for example, the trailing clevis 46 desirably includes a vertically extending hollow sleeve 49 that is fixed between the respective upper and lower flanges 46*b*, 46*c* of the trailing clevis 46 and passes through the aligned holes 46*a* through the respective upper and lower flanges 46*b*, 46*c* of the trailing clevis 46. The vertically extending hollow sleeve 49 is configured to receive therethrough a clevis pin 44, which is freely rotatable with respect to the inner cylindrical surface that defines the interior space of the hollow sleeve 49.

Figure 7A:
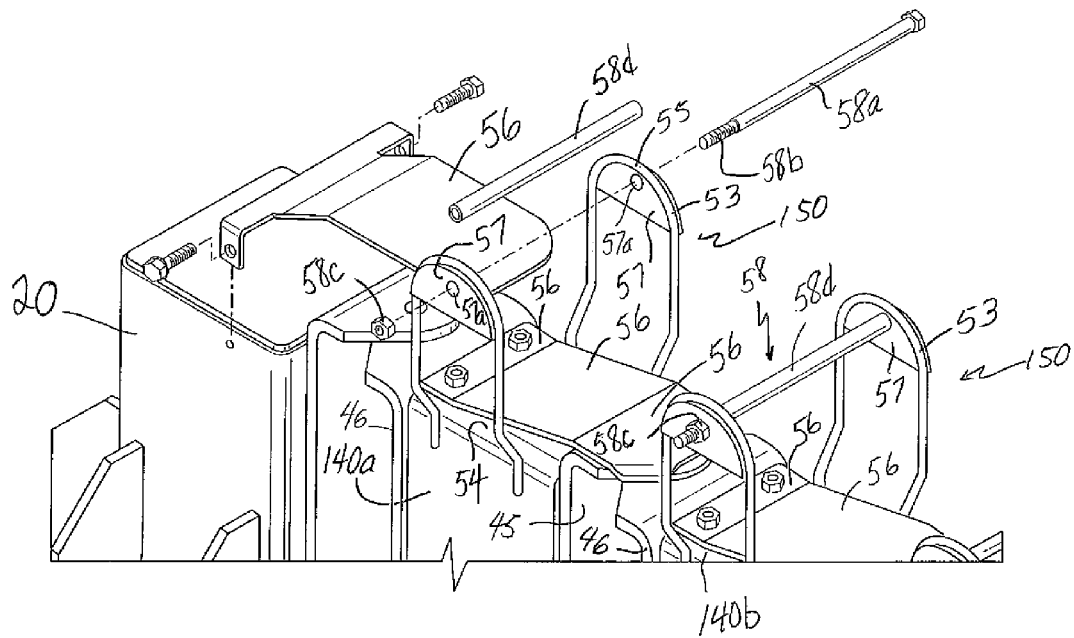
FIG. 7A is an elevated perspective view of parts of an embodiment of a self-supporting, flexible support for a hose used for loading and unloading flowable bulk product.
Figure 7B:
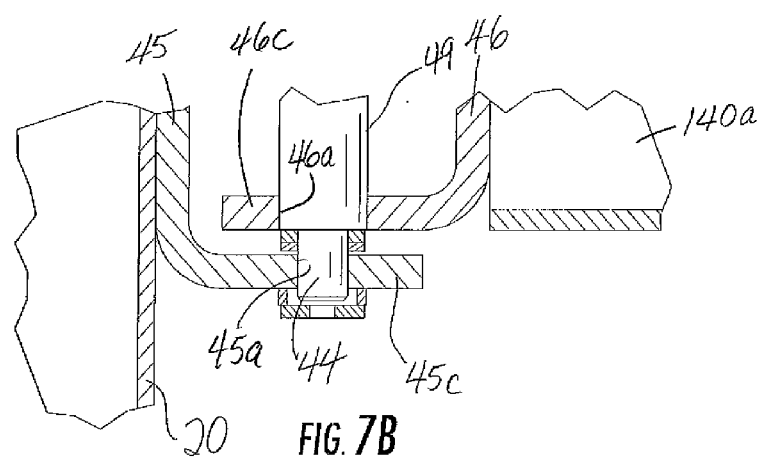
FIG. 7B is an enlarged cross-sectional view taken along the direction of the arrows designated 7B-7B in FIG. 6 of an embodiment of a self-supporting, flexible support for a hose used for loading and unloading flowable bulk product.

As schematically shown in FIGS. 2A and 7A or example, each trailing clevis 46 of each respective carriage member 40*o*, 140*a* is configured to be received within each leading clevis 45 of each neighboring carriage member 40*n* or the stanchion 20. Similarly, as schematically shown in FIGS. 2A and 7B for example, the leading clevis 45 of a neighboring carriage member 40*n* or the stanchion 20 defines a pair of aligned holes 45*a* configured to receive therethrough the same clevis pin 44. The pair of aligned holes 46*a* in the trailing clevis 46 of the respective first carriage member 40*o* or 140*a* are aligned with the pair of aligned holes 45*a* in the leading clevis 45 of the neighboring carriage member 40*n* or the stanchion 20 (as the case may be) so that the clevis pin 44 inserted through these aligned holes 45*a*, 46*a* and through the hollow sleeve 49 pivotally connects the trailing clevis 46 of the respective first carriage member 40*o* or 140*a* and the leading clevis 45 of a neighboring carriage member 40*n* or the stanchion 20. In this way, the respective first carriage member 40*o* or 140*a* is pivotally connected to one of its respective neighboring carriage members 40*n* or the stanchion 20.

Moreover, the opposite arrangement is also possible with the hollow sleeve 49 held in the leading clevis on the respective leading end 41 or 141 of the respective carriage member 40 or 140. Of course in this opposite arrangement, the leading clevis holding the hollow sleeve 49 then becomes vertically smaller than the trailing clevis so that the leading clevis can be inserted within the neighboring trailing clevis.

As schematically shown in FIG. 3 for example, the first end 41 of the first carriage member 40*o* is similarly pivotally connected to the second end 42 of its other neighboring carriage member 40*p*. As schematically shown in FIG. 2A for example, there is a plurality of clevis pins 44, and one clevis pin 44 is provided for each pivotal connection between the first and second ends 41, 42 of neighboring carriage members 40. Thus, the respective self-supporting, flexible support 16, 116 of the present invention including a plurality of respective pivotally connected carriage members 40 or 140 desirably exhibits flexibility of pivoting movement in a generally horizontal X-Y plane that is pivotally anchored at one end to the stanchion 20.

As schematically shown in FIGS. 3 and 4 for example, the second clevis 46 of the first carriage member 40*o* is configured with a generally triangular shape that has a base of the triangle where the second clevis 46 is connected to the first carriage member 40*o* and tapers from the base of the triangle toward an apex where the holes 46*a* are defined. This same configuration is exhibited by the upper flanges 46*b* and lower flanges 46*c* of the respective second clevis 46 of each of the carriage members 140*e*, 140*f*, 140*l* schematically shown in FIGS. 8, 9 and 10 for example. As schematically shown in FIGS. 4, 8, 9 and 10 for example, the opposed extreme ends of the base of each triangularly shaped second clevis 46 desirably define a pair of shoulders 47. Desirably, the triangular shape of the second clevis 46 of the respective first carriage member 40o or 140 emulates an isosceles triangle with the shoulders 47 of the second clevis 46 at the ends of the base of the isosceles triangle.

In accordance with one aspect of the present invention, it is desirable to restrict the freedom of pivoting movement of each respective end 41, 141 or 42, 142 of the respective carriage member 40 or 140 to the respective opposing end 42, 142 or 41, 141 of the respective neighboring carriage member 40 or 140. FIG. 3 schematically depicts pivoting movements between carriage members 40o and 40p, and such pivoting movements are permitted by the configuration and thus are deemed unlikely to bend the hose 10 beyond its desired bend radius.

In the embodiment schematically shown in FIGS. 2A and 4 for example, a first stop member 48 desirably is carried by the first end 41 of the neighboring carriage member 40n to the first carriage member 40o. As schematically shown in FIG. 4 for example, a similar first stop member 48 is disposed so that the pair of first stop members 48 carries the first clevis 45 that is defined at the first end 41 of the neighboring carriage member 40n. One of the first stop members 48 is disposed beneath the upper clevis flange 45b with the triangularly-shaped end through which the holes 45a are defined, and the other first stop member 48 is disposed beneath the lower clevis flange 45c with the triangularly-shaped end through which the holes 45a are defined.

Figure 5:
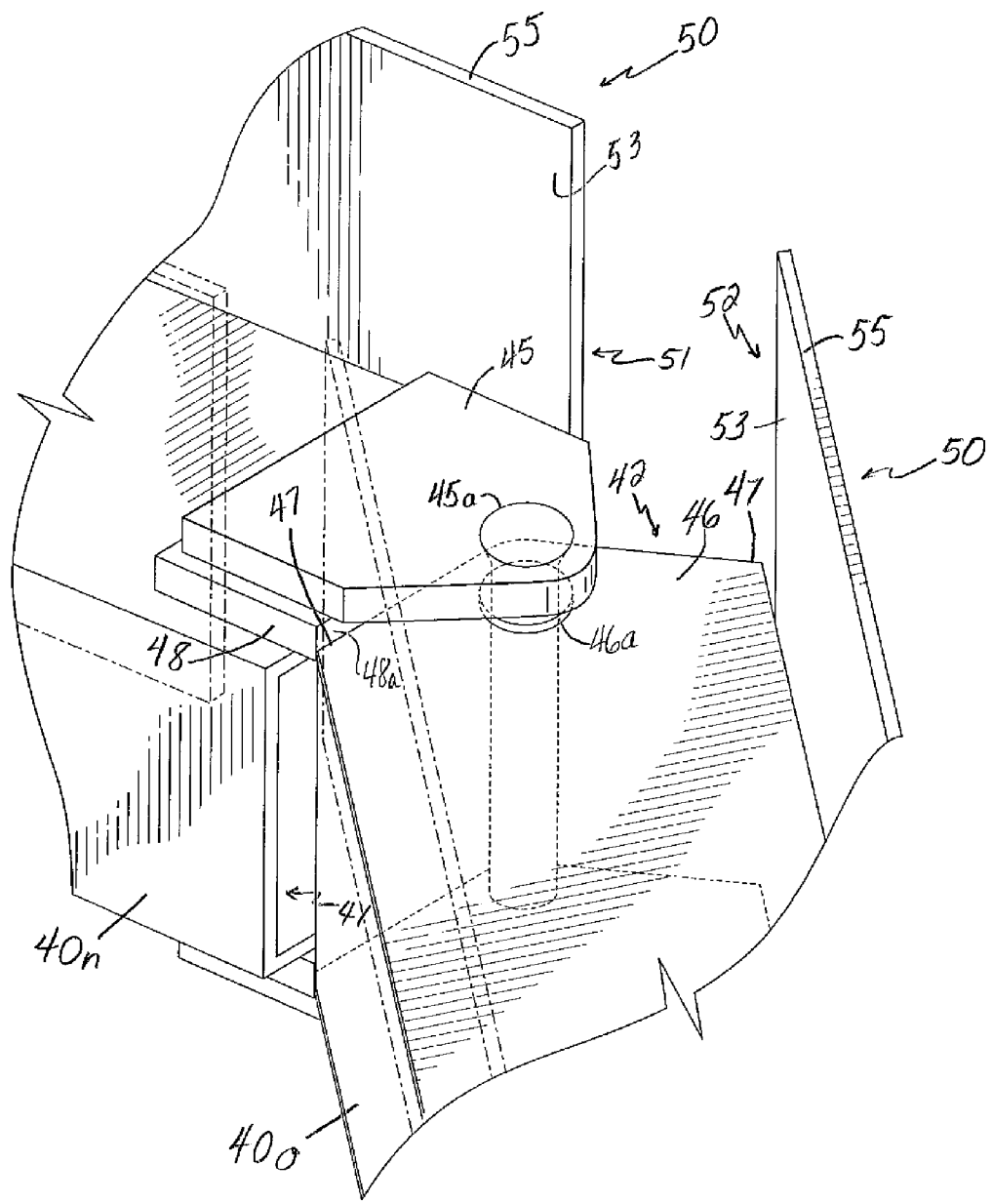
FIG. 5 is an enlarged elevated perspective view of parts of the detail of FIG. 2A shown in a different orientation from the view shown in FIG. 4.

As schematically shown in FIG. 2A for example, each of the first stop members 48 is disposed to rest at the same height as the opposing second clevis 46 of the first carriage member 40o. Moreover, each of the first stop members 48 defines a forward edge 48a that faces the opposing second clevis 46 of the first carriage member 40o. As schematically shown in FIG. 5 for example, one of the shoulders 47 of the second clevis 46 of the first carriage member 40o contacts the forward edge 48a of the first stop member 48 so as to restrict the freedom of pivoting movement of the two neighboring carriage members 40o, 40n. Similarly, in the embodiment depicted in FIG. 12 for example, the shoulders 47 of the upper clevis flange 46b and the lower clevis flange 46c will eventually contact the vertically extending connecting plate 45d of the leading clevis 45. In so doing, each respective embodiment of the support 16 or 116 of the present invention can be configured to prevent sections of the hose 10 from bending beyond their desired bend radius limitations and thereby prevent the workers deploying the hose 10 from inadvertently damaging the hose 10.

FIG. 5 schematically depicts pivoting movements between carriage members 40n and 40o, and such pivoting movements are at the maximum relative angle that is permitted by the configuration. Thus, any greater pivoting angle between the central axes of the pivoting carriage members 40n, 40o than is depicted in FIG. 5 is deemed likely to bend the hose 10 beyond its desired bend radius.

Moreover, this point at which this restriction of pivoting movement occurs as depicted in the example of FIG. 5 can be controlled by advancing or retracting the forward edge 48a of the first stop member 48 relative to the position of second clevis 46 of the neighboring first carriage member 40o. This can be accomplished by positioning the first stop member 48 accordingly with respect to the position of second clevis 46 of the neighboring first carriage member 40o. Controlling the point at which this restriction of pivoting movement occurs also can be accomplished by variation of the positions of the aligned holes 45a, 46a and the clevis pin 44 passing through the aligned holes 45a, 46a of the respective first clevis 45 and second clevis 46 of the two carriage members 40n, 40o.

As schematically shown in FIGS. 2A, 4, 8, 9 and 10 for example, each respective embodiment of the self-supporting, flexible support 16 or 116 of the present invention desirably includes a plurality of cradle members 50 or 150. Each respective cradle member 50 or 150 is carried by a different respective one of the carriage members 40 or 140 so that there desirably is a one-to-one correspondence between respective carriage members 40 or 140 and respective cradle members 50 or 150.

As schematically shown in FIGS. 4, 8, 9 and 10 for example, each respective cradle member 50 or 150 defines a bed 54 that is configured for supporting a section of the flexible hose 10 (not shown in FIGS. 4, 8, 9 and 10). In the embodiment shown in FIG. 4, the bed 54 is a flat, solid metal plate on which the hose 10 can rest. As schematically shown in FIGS. 4, 8, 9 and 10 for example, each respective carriage member 40n, 140e, 140f, 140l and the bed 54 of the respective cradle member 50 or 150 desirably can be integrally formed of a short section of a hollow metal conduit having a transverse cross-sectional shape that is square or rectangular. However, the bed 54 can be formed of other materials and can take other shapes. For example, the bed 54 of the respective cradle member 50 or 150 can be formed of metal screening and/or can take a semi-cylindrical shape.

Moreover, in the embodiment shown in FIGS. 8, 9 and 10, the bed 54 is a flat, solid metal plate that is disposed beneath an inclined cover 56 (FIG. 12) on which the hose 10 can rest. As schematically shown in FIG. 12 for example, the trailing end 56b of the inclined cover 56 desirably is bolted to the bed 54. The leading end 56a of the inclined cover 56 is disposed vertically above the trailing end 56b of the inclined cover 56 and extends over the upper flange 45b of the leading clevis 45 of the carriage member 140. This provision of the inclined cover 56 desirably is part of each of the carriage members 140 in the embodiment of the articulated arm 130 that is depicted in FIG. 6 for example. In this way, the leading end 56a of the inclined cover 56 elevates the hose 10 and supports the hose 10 above the clevis pin 44 and prevents any contact between the hose 10 and the clevis pin 44 that might otherwise result in the abrading of the hose 10 in places where the neighboring carriage members 140 pivot with respect to one another.

As schematically shown in FIGS. 2A and 4 for example, each of the cradle members 50 defines a pair of spaced apart side constraints 53 extending vertically above the bed 54 and connected to the respective carriage member 40n, 40o. Similarly, as schematically shown in FIGS. 8, 9 and 10 for example, each of the cradle members 150 defines a pair of spaced apart side constraints 53 extending vertically above the bed 54 and connected to the respective carriage member 140e, 140f and 140l. The form of the side constraints 53 can range from a solid flat plate 53 as in the embodiment shown in FIGS. 2A and 4 for example, to a U-shaped rail 53 as in the embodiment shown in FIGS. 8, 9 and 10 for example. Each U-shaped rail 53 desirably has a pair of vertically extending legs that are axially spaced apart from each other. Each of these legs desirably is provided with an S-bend that bends outwardly away from the bed 54 as the U-shaped rail 53 rises vertically above the bed 54 as in the embodiments shown in FIGS. 8, 9 and 10 for example.

The spacing between the side constraints 53 of each respective cradle member embodiment 50 or 150 desirably is uniform over the entire length of the respective articulated arm 30 or 130. As schematically shown in FIGS. 2A, 4, 8, 9 and 10 for example, each of the respective cradle members 50 or 150 defines a first end 51 and a second end 52 spaced axially apart from the first end 51 of the respective cradle member 50 or 150. Each of the pair of spaced apart side constraints 53 of each respective cradle member 50 or 150 extends axially between the two ends 51, 52 of the respective cradle member 50 or 150. Moreover, as schematically shown in FIGS. 1 and 4 for example, the upper free edge 55 of each side constraint 53 of each cradle member 50 is defined by the flat, upper free edge 55 of the solid plate that forms the side constraint 53 and is disposed vertically above the bed 54. As schematically shown in FIGS. 8, 9 and 10 for example, the upper free edge 55 of each side constraint 53 of each cradle member 150 is defined by the arcuate, upper portion of the U-shaped rail 53 that forms the side constraint 53 and is disposed vertically above the bed 54.

Moreover, the spacing between the side constraints 53 of each respective cradle member 50 or 150 desirably restrains sideways outward expansion of the hose 10. Thus, the side constraints 53 of each respective cradle member 50 or 150 provide sidewall support to the hose 10 when product is being pumped under pressure through the hose 10. This becomes especially important from a safety standpoint during the onset of material being pumped through the hose 10, as the side constraints 53 restrain the hose from snapping sideways like a whip as the material passes through the hose 10.

As schematically shown in FIGS. 1, 4 and 5 for example, the top of each cradle member 50 is the space directly above the bed 54 and is left open and uncovered right past the flat, upper free edge 55 of the solid plate that forms each side constraint 53 of each cradle member 50. Thus, because the top and both ends 51, 52 of each cradle member 50 are left open, the hose 10 easily can be laid successively on the beds 54 of the cradle members 50 of the successively aligned carriage members 40 without having to thread the hose 10 through a closed conduit for example.

As schematically shown in FIGS. 7A and 12 for example, the top of each cradle member 150 is the space directly above the inclined cover 56 disposed above the bed 54 and is left open and uncovered until near the apexs of the arcuate, upper portions of the U-shaped rails 53 that form the side constraints 53 of each cradle member 150. There, as schematically shown in FIGS. 8, 9 and 10 for example, each arcuate, upper portion of the U-shaped rail 53 that forms the side constraint 53 is fitted with an end plate 57 that is held within the U-shaped rail 53 that forms the side constraint 53. As schematically shown in FIGS. 8, 9 and 10 for example, each end plate 57 defines a through hole 57a. As schematically shown in FIGS. 7A and 12 for example, a top constraint is designated generally by the numeral 58 and is selectively attachable and detachable to each end plate 57 of each cradle member 150. Thus, the top constraint 58 is disposed above the bed 54 and extends between the side constraints 53 of the carriage member 140. Each opposite end of the top constraint 58 is carried by one of the end plates 57 that is held within the arcuate, upper portion of one of the U-shaped rail 53.

In the embodiment shown in FIGS. 7A and 12, each top constraint 58 desirably is formed by an elongated bolt 58a, and the bolt 58a has one threaded end 58b that extends through a through hole 57a of one of the end plates 57 of each cradle member 150 and is secured by a threaded nut 58c. The elongated bolt 58a is received through the hollow cylindrical passage of a cylindrical sleeve 58d that is freely rotatably mounted on the elongated bolt 58a before the threaded end 58b is passed through the through holes 57a of the end plates 57 of the cradle member 150 and is secured by the threaded nut 58c. Because the cylindrical sleeve 58d freely rotates about the elongated bolt 58a, any contact between the hose 10 and the sleeve 58d is less likely to abrade the hose 10 and less likely to impede the axial movement of the hose 10 with respect to the articulated arm 130.

As schematically shown in FIGS. 7A and 12 for example, before each top constraint 58 is selectively attached to each end plate 57 of each cradle member 150, because the top and both ends 51, 52 of each cradle member 150 are left open, the hose 10 easily can be laid successively on the inclined covers 56 of the cradle members 150 of the successively aligned carriage members 140 without having to thread the hose 10 through a closed conduit for example. However, once each top constraint 58 is selectively attached to each end plate 57 of each cradle member 150, then during the onset of material being pumped through the hose 10, the top constraints 58 further restrain the hose from snapping vertically above the inclined covers 56 like a whip as the material passes through the hose 10. Removal of the hose 10 from the articulated arm 130 of the self-supporting, flexible support 116 can be accomplished by detaching the top constraints 58 and lifting the hose 10 or by sliding the hose toward the distal end 132 without first detaching one or more of the top constraints 58, whichever is more convenient.

As schematically shown in FIGS. 1, 2 and 6 for example, the bed 54 of the respective cradle member 50 or 150 carried by the respective proximal carriage member 40a or 140a is disposed at a height generally at the top end 22 of the stanchion 20. In this way, the stanchion 20 in no way interferes with the placement of the hose on the bed 54 or on the inclined cover 56 of the respective cradle member 50 or 150 carried by the respective proximal carriage member 40a or 140a.

Moreover, in the embodiment schematically shown in FIGS. 1 and 2 for example, the dispositions of the heights of the beds 54 of the cradle members 50 carried by the carriage members 40 disposed between the proximal carriage member 40a and the distal carriage member 40s are generally the same as the height of the bed 54 of the cradle member 50 carried by the proximal carriage member 40a. Any difference between the height of the bed 54 of the cradle member 50 carried by the proximal carriage member 40a and the height of the bed 54 of the cradle member 50 carried by the distal carriage member 40s is due to the gravitational effects of the weight of the intervening carriage members 40, the weight of the hose 10 and the weight of the hose's contents on the cantilever formed by the articulated arm 30. As schematically shown in FIGS. 1 and 2 for example, the effects of this gravitational effect are at least partially offset by having the elevation of each upper flange 45b of each leading clevis 45 of each carriage member 40 disposed above the elevation of the bed 54 even though the elevation of each upper flange 46b of each trailing clevis 46 is disposed at the same elevation as the elevation of the bed 54 of that particular carriage member 40.

Moreover, in the embodiment of the articulated arm 130 that is schematically shown in FIG. 6 for example, the dispositions of the heights of the beds 54 and inclined covers 56 of the cradle members 150 carried by the carriage members 140 disposed between the proximal carriage member 140a and the distal carriage member 140q are generally elevated above the height of the bed 54 and inclined cover 56 of the cradle member 150 carried by the proximal carriage member 140a. The reason for this increasing elevation can be understood by regarding the respective carriage members 140e, 140f and 140l schematically shown in FIGS. 8, 9 and 10 for example.

As schematically shown in FIGS. 8, 9 and 10, in each of these respective carriage members 140e, 140f and 140l, the elevation of each upper flange 46b of each trailing clevis 46 is disposed beneath the elevation of the bed 54 while the elevation of each upper flange 45b of each leading clevis 45 is disposed above the elevation of the bed 54. Moreover, the upper flange 46b and lower flange 46c of each trailing clevis 46 fits in between the upper flange 45b and lower flange 45c of each leading clevis 45. Thus, as one proceeds away from the proximal carriage member 140a in the embodiment of the articulated arm 130 schematically shown in FIG. 6, each successive carriage member 140 has the height of its bed 54 and the height of its leading end 56a of its inclined cover 56 disposed at a higher elevation than the height of the bed 54 and leading end 56a of the inclined cover 56 of any preceding carriage member 140 in the articulated arm 130. Thus, the height of the bed 54 of the cradle member 150 carried by any one of the intermediate carriage members 140f, 140g, 140h, 140i, 140j, 140k is disposed above the height of the bed 54 of the cradle member 150 carried by any of the proximal carriage members 140a, 140b, 140c, 140d, 140e, and the height of the bed 54 of the cradle member 150 carried by any one of the distal carriage members 140l, 140m, 140n, 140o, 140p, 140q is disposed above the height of the bed 54 of any cradle member 150 carried by any one of the intermediate carriage members 140f, 140g, 140h, 140i, 140j, 140k.

The effect of this successively elevating arrangement of the carriage members 140 composing the embodiment of the articulated arm 130 schematically shown in FIG. 6 is to compensate for and thus counteract the gravitational effects of the weight of the intervening carriage members 140 between the proximal carriage member 140a and the distal carriage member 140q. When adding the weight of the hose 10 and the weight of the hose's contents on the cantilever formed by the embodiment of the articulated arm 130 schematically shown in FIG. 6, the elevation of the bed 54 and inclined cover 56 of the cradle member 150 carried by the distal carriage member 140q is thus likely to remain high enough above the underlying ground to prevent the bottom edge 62a of the second end 62 of the end piece 60 from scraping on the underlying ground. Thus, the freedom of movement of the end piece 60 will not be impeded.

Moreover, as schematically shown in FIGS. 6, 8, 9 and 10, the carriage member (such as carriage member 140f depicted in FIGS. 6 and 9) that makes the transition from a carriage member of greater height (such as carriage member 140e depicted in FIGS. 6 and 8) desirably is provided with a brace 70, which in FIG. 9 is shown in phantom (dashed line) because the brace 70 would be hidden from the viewer with the vantage point in FIG. 9. As schematically shown in FIGS. 6 and 9, a brace 70 is provided between the underside of the carriage member 140f and the rear of the vertically extending connecting plate 46d of the trailing clevis 46. Similarly, as schematically shown in FIGS. 6 and 10, a slightly more vertically compact brace 70 is provided between the underside of the carriage member 140l and the rear of the vertically extending connecting plate 46d of the trailing clevis 46. These braces 70 also aid in counteracting the effects of gravity on the carriage members 140 that are more outwardly extended toward the end piece 60 of the articulated arm 130.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A self-supporting, flexible support for a flexible hose used for transporting flowable bulk product from a container, the support comprising:
   a. a vertically extending stanchion defining a bottom end and a top end spaced vertically apart from the bottom end;
   b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;
   c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed; and
   d. a plurality of clevis pins,
   e. wherein the bed of the cradle member carried by the proximal carriage member is disposed at a height generally at the top end of the stanchion;
   f. wherein the trailing end of each carriage member defines a trailing clevis and the leading end of each carriage member defines a leading clevis; and
   g. wherein each trailing clevis of each carriage member is configured to be received within each leading clevis of each neighboring carriage member and pivotally connected by one of the plurality of clevis pins to the leading clevis of a neighboring carriage member.

2. The hose support of claim 1, further comprising an intermediate carriage member disposed between the proximal carriage member and the distal carriage member, wherein dispositions of heights of the beds of the cradle members carried respectively by the proximal carriage member, the intermediate carriage member and the distal carriage member are generally equal.

3. A self-supporting, flexible support for a flexible hose used for transporting flowable bulk product from a container, the support comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed; and d. a clevis pin pivotally connecting a leading clevis of a first carriage member to the trailing clevis of one of two neighboring carriage members of the first carriage member;

e. wherein the bed of the cradle member carried by the proximal carriage member is disposed at a height generally at the top end of the stanchion; and f. wherein the trailing end of each carriage member defines a trailing clevis and the leading end of each carriage member defines a leading clevis.

4. The hose support of claim 3, further comprising a first stop member carried by the leading end of the first carriage member, wherein the trailing clevis of one the two neighboring carriage members of the first carriage member contacts the first stop member so as to restrict a freedom of pivoting movement of the one of the two neighboring carriage members with respect to the first carriage member.

5. A self-supporting, flexible support for a flexible hose used for transporting flowable bulk product from a container, the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed; and d. wherein the bed of the cradle member carried by the proximal carriage member is disposed at a height generally at the top end of the stanchion;

e. wherein the trailing end of each carriage member defines a trailing clevis and the leading end of each carriage member defines a leading clevis; and f. wherein the trailing clevis of a first carriage member defines a pair of aligned holes configured to receive therethrough a clevis pin, wherein the trailing clevis of the first carriage member is configured with a generally triangular shape that has a base of the triangle where the trailing clevis is connected to the first carriage member and tapers from the base of the triangle toward an apex where the holes are defined and wherein opposed extreme ends of the base of the triangle define a pair of shoulders of the trailing clevis of the first carriage member.

6. The hose support of claim 5, wherein the triangular shape of the trailing clevis of the first carriage member emulates an isosceles triangle with the shoulders at the ends of the base of the isosceles triangle.

7. The hose support of claim 5, wherein the shoulders of the trailing clevis of the first carriage member contacts the leading clevis of a neighboring second carriage member so as to restrict a freedom of pivoting movement of neighboring first and second carriage members with respect to one another.

8. A self-supporting, flexible support for a flexible hose used for transporting flowable bulk product from a container the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed;

d. wherein the bed of the cradle member carried by the proximal carriage member is disposed at a height generally at the top end of the stanchion;

e. wherein the trailing end of each carriage member defines a trailing clevis and the leading end of each carriage member defines a leading clevis; and f. wherein the trailing clevis of each carriage member defines a pair of aligned holes configured to receive therethrough a clevis pin, wherein the trailing clevis of each carriage member is configured with a generally triangular shape that has a base of the triangle where the trailing clevis is connected to the carriage member and tapers from the base of the triangle toward an apex where the holes are defined and wherein opposed extreme ends of the base of the triangle define a pair of shoulders of the trailing clevis of each carriage member.

9. The hose support of claim 8, wherein the triangular shape of the trailing clevis of each carriage member emulates an isosceles triangle with the shoulders at the ends of the base of the isosceles triangle.

10. The hose support of claim 8, wherein when one of the shoulders of the trailing clevis of a first carriage member contacts the leading clevis of a neighboring second carriage member, a freedom of pivoting movement of the two neighboring carriage members with respect to each other becomes restricted.

11. A self-supporting, flexible support for a flexible hose used for transporting flowable bulk product from a container the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed;

d. wherein the bed of the cradle member carried by the proximal carriage member is disposed at a height generally at the top end of the stanchion; and e. wherein each carriage member defines a height measured in the vertical direction, the height of the proximal carriage member being greater than the height of the distal carriage member.

12. The hose support of claim 11, wherein the trailing end of each carriage member defines a trailing clevis and the leading end of each carriage member defines a leading clevis.

13. The hose support of claim 11, further comprising an intermediate carriage member disposed between the proximal carriage member and the distal carriage member, wherein the height of the intermediate carriage member is smaller than the height of the proximal carriage member and greater than the height of the distal carriage member.

14. The hose support of claim 11, further comprising an inclined cover disposed above at least one of the beds of one of the carriage members.

15. The hose support of claim 11, further comprising a top constraint disposed above the bed of at least one cradle member of at least one carriage member and extending between the side constraints of the at least one cradle member of at least one carriage member.

16. A self-supporting, flexible support for a flexible hose used for transporting flowable bulk product from a container, the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed;

d. an end piece having a first end connected to the distal carriage member and a second end spaced axially apart for the first end; and e. a chute that is carried by the end piece and extends axially from the first end of the end piece to the second end of the end piece, the chute having a downwardly sloping floor and a pair of downwardly sloping and spaced apart sides extending vertically above the floor; and f. wherein the bed of the cradle member carried by the proximal carriage member is disposed at a height generally at the top end of the stanchion.

17. The hose support of claim 16, wherein the sides of the chute are spaced apart in a diverging manner.

18. The hose support of claim 16, wherein the first end of the end piece is pivotally connected to the distal carriage member.

19. A self-supporting, flexible support for a flexible hose used for transporting flowable bulk product from a container, the support comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed;

d. wherein the bed of the cradle member carried by the proximal carriage member is disposed at a height generally at the top end of the stanchion;

e. wherein the trailing end of each carriage member defines a trailing clevis and the leading end of each carriage member defines a leading clevis; and f. wherein at least one of the carriage members has its trailing clevis defined by an upper flange that disposed beneath its bed, and wherein the at least one of the carriage members has its leading clevis defined by an upper flange that disposed above its bed.

20. A self-supporting, flexible support for a flexible hose used for transporting flowable bulk product from a container, the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed; and d. an intermediate carriage member disposed between the proximal carriage member and the distal carriage member, wherein a height of the bed of the cradle member carried by the intermediate carriage member is disposed above a height of the bed of the cradle member carried by the proximal carriage member, and a height of the bed of the cradle member carried by the distal carriage member is disposed above the height of the bed of the cradle member carried by the intermediate carriage member; and e. wherein the bed of the cradle member carried by the proximal carriage member is disposed at a height generally at the top end of the stanchion.

21. A self-supporting, flexible support for a flexible hose used for transporting flowable bulk product from a container the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed; and d. a top constraint disposed above the bed of at least one cradle member of at least one carriage member and extending between the side constraints of the at least one cradle member of at least one carriage member;

e. wherein the bed of the cradle member carried by the proximal carriage member is disposed at a height generally at the top end of the stanchion; and f. wherein the top constraint includes an elongated bolt extending between the side constraints of the at least one cradle member, the top constraint further including a hollow cylindrical sleeve freely rotatably mounted on the elongated bolt.

22. A self-supporting, flexible support for a flexible hose used for transporting flowable bulk product from a container the support, comprising:

a. a vertically extending stanchion defining a bottom end and a top end spaced vertically apart from the bottom end;

b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;

c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed;

d. wherein the bed of the cradle member carried by the proximal carriage member is disposed at a height generally at the top end of the stanchion; and e. wherein at least one of the side constraints of at least one cradle member of at least one carriage member includes a U-shaped rail defining a pair of vertically extending legs that are axially spaced apart from each other and wherein each of these legs is provided with an S-bend that bends outwardly away from the bed of the at least one cradle member of at least one carriage member as the U-shaped rail extends vertically above the bed of the at least one cradle member of at least one carriage member.

23. The hose support of claim 22, further comprising an end plate, wherein the U-shaped rail includes an arcuate, upper portion connecting the pair of legs, and the arcuate, upper portion of the U-shaped rail holds the end plate.

24. A self-supporting, flexible support for a flexible hose used for transporting flowable bulk product from a container, the support, comprising:

a. a vertically extending stanchion defining a bottom end and a top end spaced vertically apart from the bottom end;
b. an articulating arm forming a cantilever defining a proximal end pivotally connected to the stanchion, the articulating arm extending outwardly in a generally horizontal direction with respect to the vertically extending stanchion and terminating in a distal end, the articulating arm including a plurality of carriage members, each carriage member having a trailing end and a leading end disposed spaced apart in an axial direction from the trailing end of the carriage member, the proximal end of the articulating arm being defined by a proximal carriage member, the proximal carriage member having its trailing end pivotally connected to the stanchion, a distal carriage member being disposed by the distal end of the articulating arm, the distal carriage member having its trailing end pivotally connected to the leading end of one of a plurality of other carriage members, each of any remaining carriage members being disposed between two neighboring carriage members and having its trailing end pivotally connected to the leading end of a more proximally disposed one of the two neighboring carriage members and its leading end pivotally connected to the trailing end of a more distally disposed one of the two neighboring carriage members;
c. a plurality of cradle members, each cradle member being carried by a different respective one of the carriage members, each cradle member defines a bed configured to be disposed beneath a section of the flexible hose, each of the cradle members defines a first end, each of the cradle members defines a second end spaced axially apart from the first end of the cradle member, each of the cradle members defines a pair of spaced apart side constraints extending vertically above the bed and axially between the two ends of the cradle member, each cradle member being open at each axially spaced apart end and at a top disposed vertically above the bed of at least one cradle member of at least one carriage member; and
d. an end plate and a top constraint, the top constraint being disposed above the bed and extending between the side constraints of the at least one cradle member of at least one carriage member, wherein the top constraint includes an elongated bolt extending between the side constraints of the at least one cradle member, the top constraint further including a hollow cylindrical sleeve freely rotatably mounted on the elongated bolt, wherein at least one of the side constraints of at least one cradle member of at least one carriage member includes a U-shaped rail defining a pair of vertically extending legs that are axially spaced apart from each other and wherein each of these legs is provided with an S-bend that bends outwardly away from the bed of the at least one cradle member of at least one carriage member as the U-shaped rail extends vertically above the bed of the at least one cradle member of at least one carriage member, wherein the U-shaped rail includes an arcuate, upper portion connecting the pair of legs, and the arcuate, upper portion of the U-shaped rail holds the end plate, which carries one end of the elongated bolt; and
e. wherein the bed of the cradle member carried by the proximal carriage member is disposed at a height generally at the top end of the stanchion.

* * * * *